(12) United States Patent
Murray

(10) Patent No.: US 8,468,077 B2
(45) Date of Patent: Jun. 18, 2013

(54) DISTRIBUTED TAX-RETURN-PREPARATION PROCESSING

(75) Inventor: David K. Murray, Carlsbad, CA (US)

(73) Assignee: TaxNet Inc., Oceanside, CA (US)

( * ) Notice: Subject to any disclaimer, the term of this patent is extended or adjusted under 35 U.S.C. 154(b) by 800 days.

(21) Appl. No.: 11/334,032

(22) Filed: Jan. 17, 2006

(65) Prior Publication Data

US 2007/0033130 A1 Feb. 8, 2007

Related U.S. Application Data

(60) Provisional application No. 60/644,328, filed on Jan. 14, 2005.

(51) Int. Cl.
*G06Q 40/00* (2012.01)

(52) U.S. Cl.
USPC ............. 705/36 T; 705/31; 705/35; 705/19

(58) Field of Classification Search
USPC ..................... 705/31, 35, 19, 36 T
See application file for complete search history.

(56) References Cited

U.S. PATENT DOCUMENTS

| | | | | |
|---|---|---|---|---|
| 4,264,953 A | * | 4/1981 | Douglas et al. | 711/3 |
| 4,485,435 A | * | 11/1984 | Sibley | 711/211 |
| 5,446,844 A | * | 8/1995 | Steckler et al. | 711/118 |
| 5,530,905 A | * | 6/1996 | Nichols et al. | 709/227 |
| 5,774,872 A | * | 6/1998 | Golden et al. | 705/19 |
| 7,103,606 B2 | * | 9/2006 | Brown et al. | 707/102 |
| 2002/0091602 A1 | * | 7/2002 | Stern et al. | 705/35 |
| 2002/0111888 A1 | * | 8/2002 | Stanley et al. | 705/31 |
| 2003/0009465 A1 | * | 1/2003 | Brown et al. | 707/100 |

* cited by examiner

*Primary Examiner* — Daniel Felten
(74) *Attorney, Agent, or Firm* — Hovey Williams LLP

(57) ABSTRACT

A method includes providing to a tax-data provider a set of computer-executable instructions that, when executed by an electronic device, generate a user interface displayable on a display device coupled to the electronic device and operable to enable the tax-data provider to enter a tax-data set. The electronic system receives, but does not store, the tax-data set. A mathematical operation is performed using the received tax data, yielding a value. The electronic system provides the value to the electronic device.

13 Claims, 4 Drawing Sheets

DISTRIBUTED TAX-RETURN-PREPARATION PROCESSING

PRIORITY CLAIM

The present application claims priority from U.S. Provisional Application No. 60/644,328 filed Jan. 14, 2005, which is, along with commonly owned and co-pending U.S. patent application Ser. No. 11/334,033 entitled "USER INTERFACE FOR TAX-RETURN PREPARATION," and commonly owned and co-pending U.S. patent application Ser. No. 11/334,730 entitled "USER INTERFACE AND DATA ACQUISITION FOR TAX-RETURN PREPARATION," herein incorporated by reference.

FIELD OF THE INVENTION

This invention relates generally to computing environments and, more specifically, to a user interface and system enabling a user to prepare a tax return.

BACKGROUND OF THE INVENTION

Many of those who prepare tax returns are familiar with the myriad tax-return-preparation-software products currently available. Some versions of these products allow the user to prepare a tax return online. A typical online product employs a secure web interface that allows customers to enter tax-data, which is then encrypted and transmitted for storage on a database associated with servers maintained by the product vendor. In such an arrangement, the user must rely on security measures taken by the vendor to store and safeguard this tax data, which may include sensitive information.

SUMMARY OF THE INVENTION

In an embodiment of the invention, a method includes providing to a tax-data provider a set of computer-executable instructions that, when executed by an electronic device, generate a user interface displayable on a display device coupled to the electronic device and operable to enable the tax-data provider to enter a tax-data set. The electronic system receives, but does not store, the tax-data set. A mathematical operation is performed using the received tax data, yielding a value. The electronic system provides the value to the electronic device.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
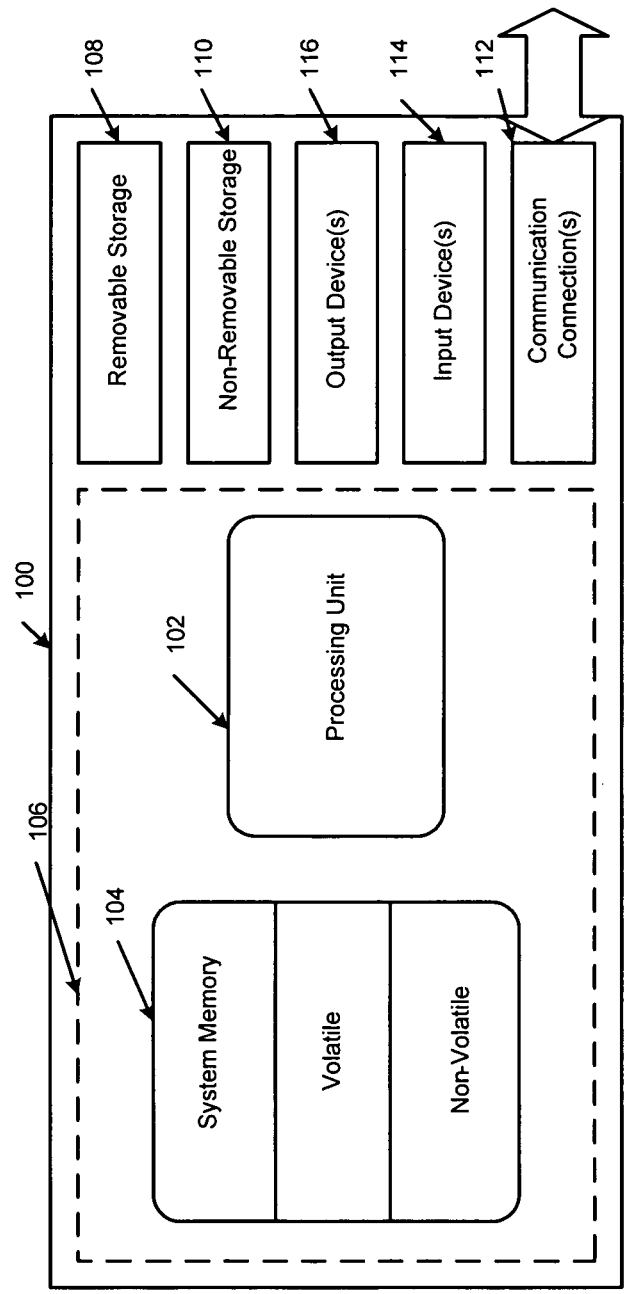
FIG. 1 is a schematic view of an exemplary operating environment in which an embodiment of the invention can be implemented.

FIG. 1 illustrates an example of a suitable computing system environment 100 on which an embodiment of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general-purpose or special-purpose computing-system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed-computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed-computing environment, program modules may be located in both local- and remote-computer storage media including memory storage devices.

With reference to FIG. 1, an exemplary system for implementing an embodiment of the invention includes a computing device, such as computing device 100. In its most basic configuration, computing device 100 typically includes at least one processing unit 102 and memory 104.

Depending on the exact configuration and type of computing device, memory 104 may be volatile (such as random-access memory (RAM)), non-volatile (such as read-only memory (ROM), flash memory, etc.) or some combination of the two. This most basic configuration is illustrated in FIG. 1 by dashed line 106.

Additionally, device 100 may have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communications connection(s) 112 that allow the device to communicate with other devices. Communications connection(s) 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared and other wireless media. The term computer-readable media as used herein includes both storage media and communication media.

Device 100 may also have input device(s) 114 such as keyboard, mouse, pen, voice-input device, touch-input device, etc. Output device(s) 116 such as a display, speakers, printer, etc. may also be included. All such devices are well-known in the art and need not be discussed at length here.

Figure 2:
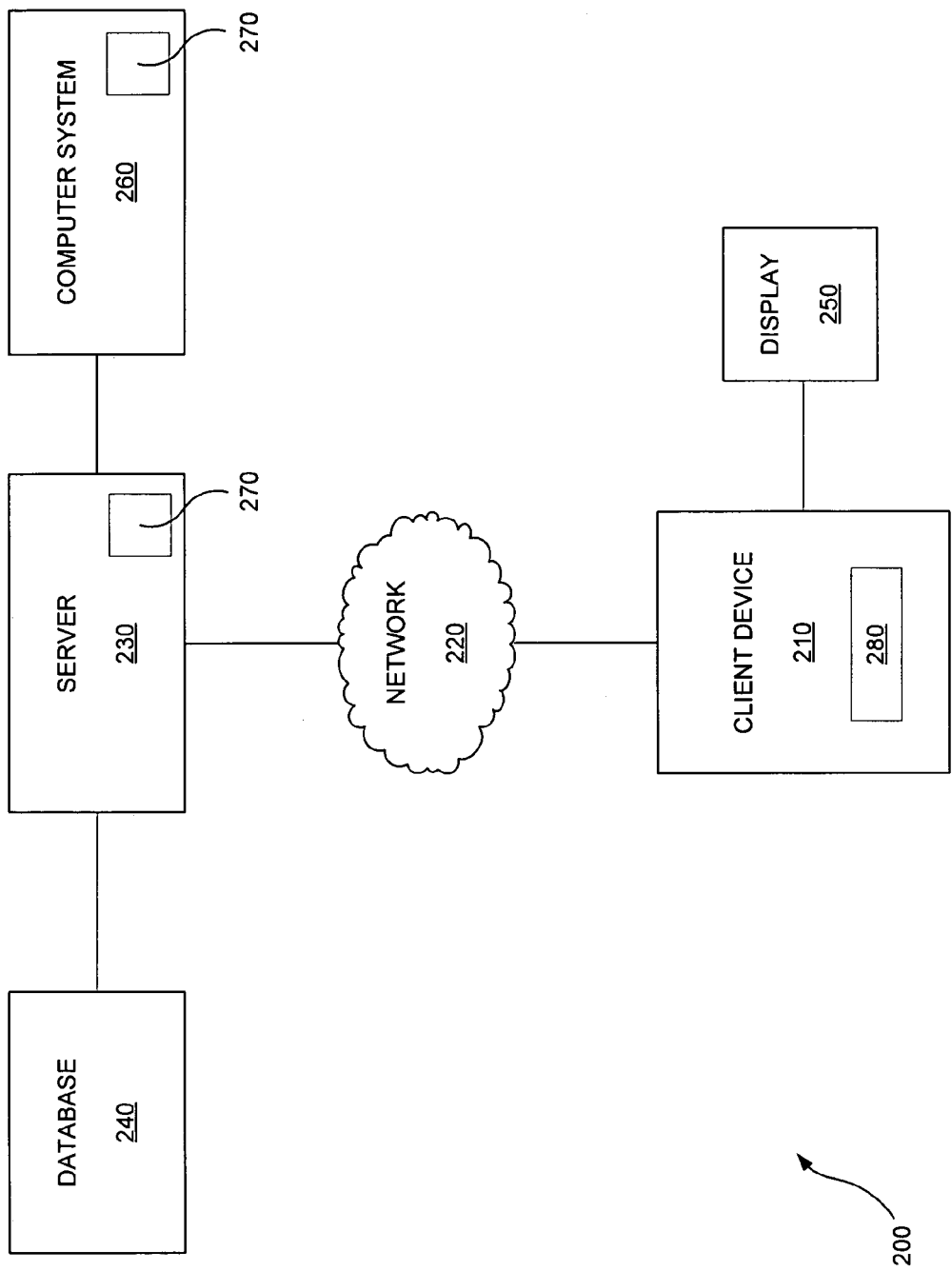
FIG. 2 is a functional block diagram of an exemplary operating environment in which an embodiment of the invention can be implemented.

Referring now to FIG. 2, an embodiment of the present invention can be described in the context of an exemplary computer network system 200 as illustrated. System 200 includes an electronic client device 210, such as a personal computer or workstation, that is linked via a communication medium, such as a network 220 (e.g.,. the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

In an embodiment, each of the client device 210 and server 230 may include all or fewer than all of the features associated with the device 100 illustrated in and discussed with reference to FIG. 1. Client device 210 includes or is otherwise coupled to a computer screen or display 250. As is well known in the art, client device 210 can be used for various purposes including both network- and local-computing processes.

The client device 210 is linked via the network 220 to server 230 so that computer programs, such as, for example, a browser, running on the client device 210 can cooperate in two-way communication with server 230. Server 230 may be coupled to database 240 to retrieve information therefrom and to store information thereto. Database 240 may include a plurality of different tables (not shown) that can be used by server 230 to enable performance of various aspects of embodiments of the invention. Additionally, the server 230 may be coupled to the computer system 260 in a manner allowing the server to delegate certain processing functions to the computer system.

An embodiment of the invention includes a tax-data-processing engine 270, the functionality of which is discussed more fully hereinafter. At least portions of the engine 270 may be executed by the server 230. Alternatively or additionally, at least portions of the engine 270 may be executed by the computer system 260. The engine 270 may be implemented in any suitable hardware, software, firmware, or combination thereof.

Still referring to FIG. 2, and in operation according to an embodiment of the invention, a user (not shown) of the client device 210 desiring to electronically prepare a tax return uses a browser application running on the client device to access web content, which may, but need not, be served by the server 230. Specifically, by employing an appropriate uniform resource locator (URL) in a known manner, the user may download from the server 230 and install on the client device 210 a user-interface module 280 comprising computer-executable instructions as described more fully hereinafter. Alternatively, the user may receive the module 280 on a tangible computer-readable medium (not shown), such as, for example, a CD-ROM, and subsequently install the module on the client device 210 from the medium.

Figure 3:
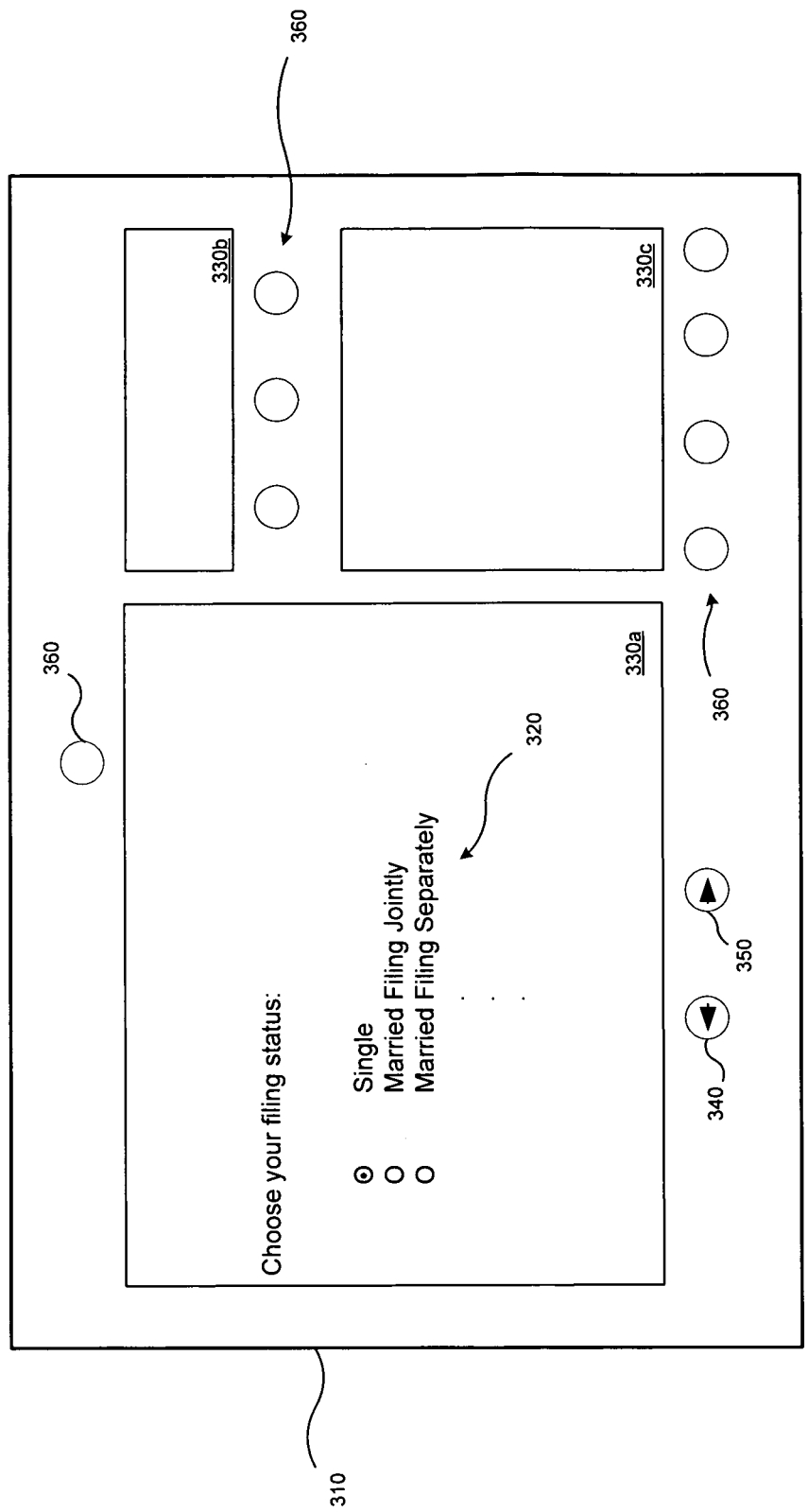
FIG. 3 is a first schematic view of a graphical user interface (GUI) according to an embodiment of the invention.

Upon execution of the module 280 by the client device 210, and referring to FIG. 3, a user interface 310 may be displayed on the display device 250. Features and functionality of the interface 310 are described in commonly owned and co-pending U.S. patent application Ser. No. 11/334,033 entitled "USER INTERFACE FOR TAX-RETURN PREPARATION," which is, along with commonly owned and co-pending U.S. patent application Ser. No. 11/334,730 entitled "USER INTERFACE AND DATA ACQUISITION FOR TAX-RETURN PREPARATION," herein incorporated by reference.

In an embodiment, and still referring to FIG. 3, the user interface 310 includes a plurality of panes 330a-330c within which information can be displayed and/or entered. Although the user interface 310 illustrated in FIG. 3 includes three panes 330a-330c, it is to be understood that embodiments of the invention described herein may be implemented in a user interface having more or fewer than three such panes.

Still referring to FIG. 3, the module 280 may employ one or more appropriate uniform resource locators (URLs) in a known manner to request one or more web pages 320 to be displayed in a pane 330. In an embodiment, the one or more web pages 320 present an interview soliciting entry by the user of tax data necessary to prepare a tax return. The one or more web pages 320 may be navigable by the user using a conventional "Previous" button 340 and "Next" button 350 provided in the user interface 310.

In an embodiment, as the tax data is entered by the user, the tax data is stored on the client device 210. At one or more points during the interview process, portions of the tax data may be used to perform one or more a calculations. For example, it may be necessary to calculate the exclusion of a home sale or a tax refund. Accordingly, the tax data to be used for such a calculation may be provided by the client device 210 to the engine 270. Upon receiving the tax data, the engine 270 may perform the required calculation to yield a resulting value (e.g., tax-refund amount). Subsequently, the server 230 may provide the resulting value to the client device 210. Alternatively or additionally, the engine 270 may, in response to receiving the tax data, provide to the client device 210 a tax form corresponding to the data and displayable in the user interface 310.

Advantageously, in an embodiment, the tax data received by the engine 270 is not stored by the server 230, the database 240 or the computer system 260. Alternatively, the tax data is transiently stored in a memory device of the server 230 and/or the computer system 260. In this case, upon completion of the calculation, the tax data is immediately purged from the memory device.

Figure 4:
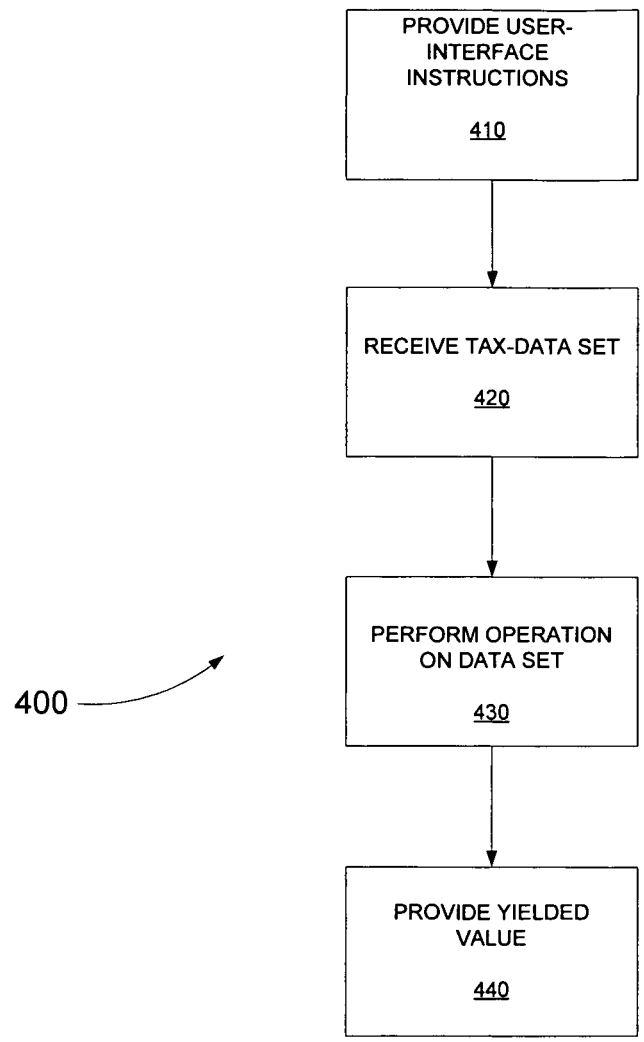
FIG. 4 is a flow diagram illustrating a method according to an embodiment of the invention.

FIG. 4 illustrates a process 400 according to an embodiment of the invention. The process 400 is illustrated as a set of operations shown as discrete blocks. The process 400 may be implemented in any suitable hardware, software, firmware, or combination thereof. The order in which the operations are described is not to be necessarily construed as a limitation.

At a block 410, a set of computer-executable instructions is provided to a tax-data provider that, when executed by an electronic device, generate a user interface displayable on a display device coupled to the electronic device. The user interface may be operable to enable the tax-data provider to enter a tax-data set. For example, the tax-data provider may download from the server 230 and install on the client device 210 a user-interface module 280 comprising computer-executable instructions. Alternatively, the tax-data provider may receive the module 280 on a tangible computer-readable medium (not shown). Upon execution of the module 280 by the client device 210, a user interface 310 may be displayed on the display device 250. The user interface may enable presentation of an interview soliciting entry by the tax-data provider of tax data necessary to prepare a tax return.

At a block 420, an electronic system receives the tax-data set. In an embodiment, the electronic system does not store the tax-data set. For example, the tax data entered by the tax-data provider may be provided to the server 230. The tax data received by the server 230 is not stored by the server, the database 240 or the computer system 260. Alternatively, the tax data is transiently stored in a memory device of the server 230 and/or the computer system 260. In this case, upon completion of a calculation involving the tax data (described below with reference to block 430), the tax data is immediately purged from the memory device.

At a block 430, a mathematical operation using the received tax-data set is performed. The operation yields a value. For example, upon receipt of the tax data by the server 230, the engine 270 may perform a required tax-related calculation to yield a resulting value (e.g., tax-refund amount).

At a block 440, the electronic system provides the value to the electronic device. For example, the server 230 may provide the resulting value to the client device 210. Subsequently, the client device 210, server 230, and/or computer system 260 may prepare and/or file an electronic tax return using the tax data and/or calculations.

While a preferred embodiment of the invention has been illustrated and described, as noted above, many changes can be made without departing from the spirit and scope of the invention. For example, while the tax-data calculations have been primarily described herein as being performed by the engine 270, all or some of these calculations may be performed by the client device 210. Additionally, the user interface 310 may enable the user to choose which of the calculations (e.g., those involving particularly sensitive tax data) are to be performed exclusively by the client device 210. Accordingly, the scope of the invention is not limited by the disclosure of the preferred embodiment. In one embodiment, a business method comprises providing one or more of the features and/or functions described above to users free of charge over the Internet. In another embodiment, the use of the system is provided for preparation of federal tax returns free of charge, and charges are only implied for non-federal (e.g. state returns). Alternatively, use for federal returns is charged, and for others is free of charge. Instead, the invention should be determined entirely by reference to the claims that follow.

The embodiments of the invention in which an exclusive property or privilege is claimed are defined as follows:

1. A method comprising:
    providing to a tax-data provider a user-interface module that, when executed by an electronic device, generates a user interface displayable on a display device coupled to the electronic device and operable to enable the tax-data provider to enter a tax-data set;
    receiving, with an electronic system, the tax-data set;
    performing, with the electronic system, a mathematical operation using a portion of the received tax-data set, the portion being less than the entire tax-data set, wherein the operation yields a value of a tax-refund amount, and wherein the electronic system purges the entire tax-data set after the operation is performed; and
    transmitting, with the electronic system, the value to the electronic device.

2. The method of claim 1 wherein providing the user-interface module comprises transferring the user-interface module through a communications medium.

3. The method of claim 1, further comprising providing, with the electronic system, one or more web pages to the electronic device, the one or more web pages displayable in the user interface, the one or more web pages including a field into which the tax-data provider can input the tax-data set.

4. A system, comprising:
    a user-interface module executed by a client device, the user-interface module operable to generate a user interface displayable on a display device coupled to the client device, the user interface operable to enable a tax-data provider to enter a tax-data set; and
    a tax-data-processing engine executed by an electronic system, the processing engine operable to receive the tax-data set from the client device, the processing engine further operable to perform a mathematical operation using a portion of the received tax-data set, the portion being less than the entire tax-data set, wherein the operation yields a value of a tax-refund amount, and wherein, upon performing the operation, the entire tax-data set is purged from the electronic system.

5. The method of claim 1, further comprising preparing a tax return using the value.

6. The method of claim 5, further comprising causing the tax return to be electronically filed.

7. The system of claim 4 wherein the user-interface module is further operable to perform the operation.

8. The system of claim 7 wherein the user-interface module is further operable to enable the provider to select one of the user-interface module and engine to perform the operation.

9. The system of claim 4 wherein the user-interface module is further operable to cause a tax return to be prepared.

10. The system of claim 9 wherein the user-interface module is further operable to cause the tax return to be electronically filed.

11. The system of claim 4 wherein the user-interface module is further operable to cause the tax-data set to be stored by the client device.

12. The system of claim 4 wherein the processing engine is further operable to transmit the value to the client device.

13. The system of claim 12 wherein the user-interface module is further operable to cause the value to be stored by the client device.

* * * * *